(12) United States Patent
Durston et al.

(10) Patent No.: US 6,323,777 B1
(45) Date of Patent: Nov. 27, 2001

(54) TIMER WITH RESETTABLE ALARM AND AUTOMATIC TURN-OFF

(76) Inventors: Richard Vereker Durston, 77/8-12 Eyre Street, Griffith, ACT 2603; Andrew Albert Durston, Clearwell Park, Lot 122, Gooda Creek Road, Murrum Bateman, NSW 2582, both of (AU)

( * ) Notice: Subject to any disclaimer, the term of this patent is extended or adjusted under 35 U.S.C. 154(b) by 0 days.

(21) Appl. No.: 09/554,173
(22) PCT Filed: Oct. 29, 1998
(86) PCT No.: PCT/AU98/00901
  § 371 Date: May 10, 2000
  § 102(e) Date: May 10, 2000
(87) PCT Pub. No.: WO99/24998
  PCT Pub. Date: May 20, 1999

(30) Foreign Application Priority Data

Nov. 10, 1997 (AU) .................................................. PP0263

(51) Int. Cl.$^7$ ........................................................ H04L 7/00
(52) U.S. Cl. ............... 340/679; 340/825.11; 340/825.12; 340/825.18
(58) Field of Search .......................... 340/825.13, 825.11, 340/825.12, 679

(56) References Cited

U.S. PATENT DOCUMENTS

| | | | |
|---|---|---|---|
| 4,500,795 | * | 2/1985 | Hochstein et al. .................... 307/141 |
| 4,530,607 | * | 7/1985 | Bungener ............................. 368/109 |
| 4,860,005 | * | 8/1989 | DeLuca et al. ................. 340/825.44 |
| 5,153,580 | * | 10/1992 | Pollack ............................ 340/825.25 |
| 5,642,104 | * | 6/1997 | Erwin ............................. 340/825.72 |
| 5,939,992 | * | 8/1999 | Devries et al. ....................... 340/657 |

* cited by examiner

Primary Examiner—Jeffery Hofsass
Assistant Examiner—Son Tang
(74) Attorney, Agent, or Firm—James L. Sonntag

(57) ABSTRACT

A method of safely operating an electrical appliance or equipment in which the appliance or equipment is powered from a source of electrical supply so as to ensure that the said appliance or equipment does not remain energized indefinitely through neglect, omission, oversight or distraction, said method including: timing or disconnecting means for automatically switching off power to said electrical appliance or equipment after a set or selected period of time, and audible and/or visual alerting means to warn of an impending disconnection of power to the said electrical appliance or equipment through the action of the first said timing and disconnecting means as the set or selected period of time is approached and/or reached, and resetting means to re-start the sequence of operation of the said timing, disconnecting and alerting means if said electrical appliance or equipment is required to operate or remain in use for a period of time exceeding the timing and disconnecting means set or selected period, and silencing means to mute the emitted audible and/or visual warning if the said electrical appliance or equipment is required to continue to operate or remain in use for the set or selected period of time without interference by or inconvenience from the emitted warning.

7 Claims, 1 Drawing Sheet

TIMER WITH RESETTABLE ALARM AND AUTOMATIC TURN-OFF

RELATED APPLICATIONS

This application is filed under 35 U.S.C. 371 from International Application Number PCT/AU98/00901, earliest priority date Nov. 10, 1997, which claims priority from Australian PP 0263, filed Nov. 10, 1997, the disclosures of which are hereby incorporated by reference.

STATEMENT REGARDING FEDERALLY SPONSORED RESEARCH OR DEVELOPMENT (Not applicable)

FIELD OF THE INVENTION

This invention relates to appliance timers, and the like.

BACKGROUND OF THE INVENTION

Duration timers are widely used to control all types of appliances and are commonly found in the home where they form an integral part of appliances such as microwave ovens, conventional ovens, and room heaters. These timers in the main are of two distinct types, namely "duration of use" timers and "alerting" timers.

(1) "Duration of use" timers are designed to turn off an appliance at the end of a set or selected period of time and are found in appliances such as domestic microwave ovens and room heaters.

The end of the timing period is sometimes signaled by an audible and/or visual device to alert the user of the completion of the timing sequence, the audible and/or visual signal being one of short duration.

The difficulty associated with "duration of use" timers is that it may be some time before the user realizes that the appliance has been turned off as would be the case if the user was distracted by a caller at the door, an incoming telephone call or by any other task at hand.

Therefore if the appliance is required to be used for a period of time longer than originally intended to achieve a desired result, the process interrupted for a considerable period of time before it is restarted. As in some processes, cooking included, sometimes cannot yield the desired outcome if interrupted for a long period of time, it is realized that "duration of use" timers can have considerable limitations in their applications.

It is to be noted that the audible and/or visual alert signal associated with "duration of use" timers is normally of short duration and therefore can very easily result in the signal being missed altogether if the user is not in the immediate vicinity of the appliance when the time times out when the short duration alert signal is produced.

(2) "Alerting" timers are designed to alert the user of an appliance at the end of a selected period of time and are normally found in appliances such as conventional ovens. The audible and/or visual signal is provided as an alert only and the appliance remains operational until manually turned off.

The disadvantage of "Alerting" timers is that they do not turn appliances off so that when appliances incorporating such timers are used or operated by an aged person or by a person who is forgetful by nature, potentially dangerous situations may arise. A typical example is a conventional oven which when left unattended for some time as would be the case if, for example, the operator is distracted by an incoming telephone call, can cause a house fire.

OBJECTS OF THE INVENTION

It is therefore the object of this invention to provide a timer which overcomes the shortcomings and limitations of the previously mentioned "duration of use" and "alerting" timers. Such a timer incorporates means for automatically turning off the power to an electrical appliance after a set or selected period of time; alerting means to warn of an impending disconnection of power to the appliance; resetting means to re-start the timing and alerting sequence if the appliance is required to operate or remain in use for a period of time exceeding the timer time-out period; and silencing means to mute the emitted warning so that the appliance may continue to operate or be used until the timer times out without interference by the emitted warning. This facility is useful if the timer is to be allowed to time out without any extension of the time originally set or selected.

Further objects of the invention will become evident in the description below.

BRIEF SUMMARY OF THE INVENTION

The present invention relates to an appliance time comprising:

(1) timing means for automatically turning off the power to an electrical appliance after a set or selected period of time;

(2) alerting means to warn of an impending disconnection of power to the appliance through the action of the first said timer as the set or selected period of time is approached and/or reached;

(3) resetting means to re-start the timing and alerting sequence if the appliance is required to operate or remain in use for a period of time exceeding the timer time-out period; and (4) silencing means to mute the emitted warning so that the appliance may continue to operate or be used until the timer times out without interference by the emitted warning. This facility is useful if the timer is to be allowed to time out without any extension of time.

DETAILED DESCRIPTION OF THE INVENTION

Figure 1:
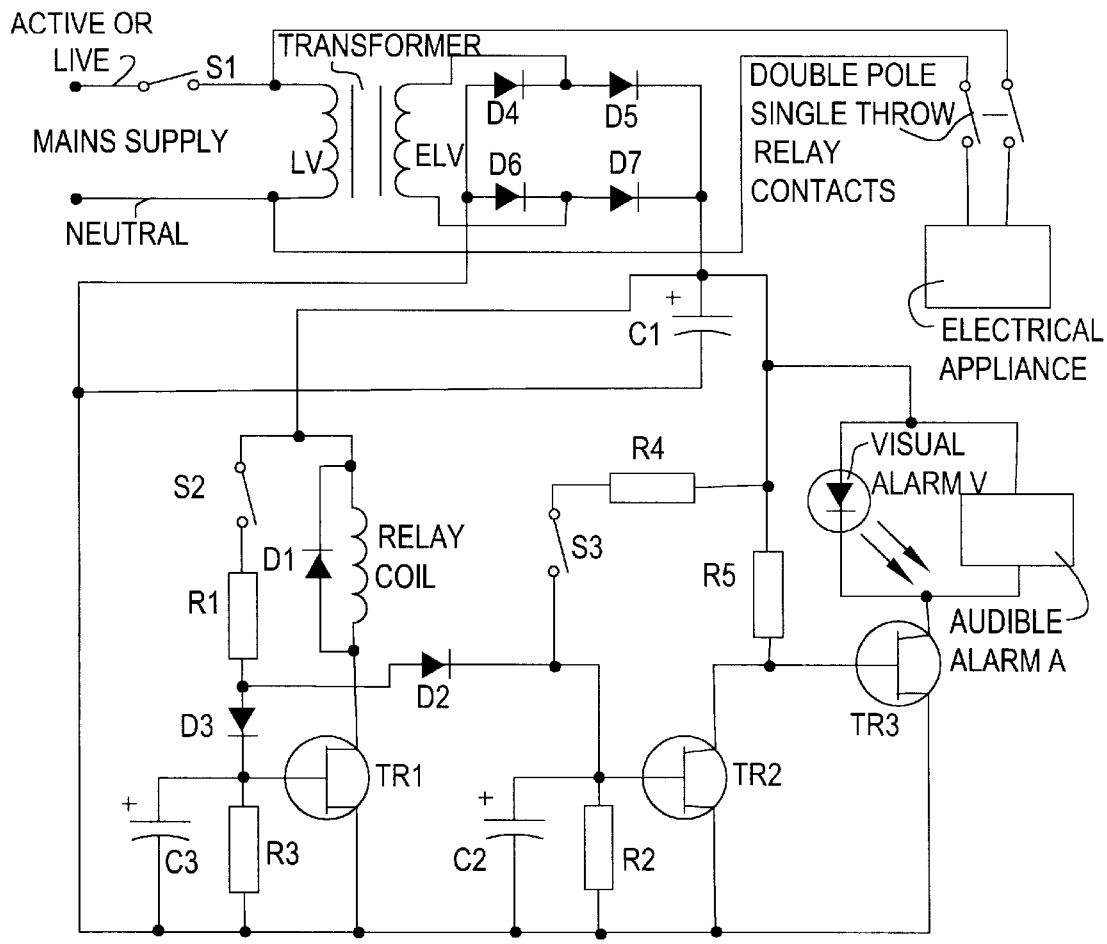
FIG. 1 is a schematic of an electrical circuit illustrating an embodiment of the invention.

The invention comprises system or timing apparatus for controlling an electrical appliance, which may be any appliance or equipment energized from a source of electrical supply. The invention comprises;

a primary timer and a primary manual resetter, where the primary timer circuit energizes the appliance for a preset interval of time beginning either when the primary timer is energized or when the primary manual setter is manually activated, and where the primary timer automatically de-energizes the appliance upon expiration of the predetermined interval of time, a secondary timer and a secondary manual resetter, where the secondary timer measures a preset interval time shorter than the interval of time of the primary timer, the preset interval of time for the secondary timer beginning when the secondary timer circuit is manually reset by manual activation of either the secondary resetter or the primary resetter, an alarm indication that indicates an alarm upon expiration of the interval of time of the secondary timer, and indicates no alarm during the interval of time of secondary timer. If the alarm is not silenced by resetting of the secondary timer, it will continue indicating, even if the time interval of the primary timer has elapsed and the appliance has been automatically turned off. The alarm may also be silences by de-energizing the alarm, i.e., turning off the main switch to the appliance, which also turns off the appliance. In the illustrated embodiment in FIG. 1, the primary and secondary timers are built around TR1, and TR2, respectively, with the primary and secondary resetters comprising respectively S2, and S3. The alarm indication includes TR3 and the audible and visual alarms. The components of the apparatus may be included as part of the appliance, as a separate module or unit. A separate module can be connectable to an electrical outlet and the appliance connected through an electrical plug. The invention also embodies a method that comprises, energizing the appliance at the beginning of a first interval of time determined by a first timer de-energizing the appliance at the end of the first interval of time, the first interval of time begun by energizing the first timer or by manually resetting the first timer, activating an alarm indication at the end of a second interval of time during which there is no alarm indication, the second interval of time beginning when the first timer is energized or reset, or when the second time is manually reset.

An embodiment of the invention is described in the following specification and accompanying drawing. The drawing, however, is merely illustrative of how the invention might be put into effect and is not to be understood as being limiting on the invention.

FIG. 1 shows the connection of the active (live) and neutral conductors of a low voltage mains supply to the primary winding of a transformer, on one side, and to an electrical appliance on the other, the latter connection being through a set of normally open double pole single throw relay contacts.

When switch S1 is closed, the secondary of the transformer and its associated bridge rectifier circuit consisting of Diodes D4, D5, D6 and D7 provide an extra low DC voltage across capacitor C1 for the purpose of energizing the control circuit whose operation is as follows:

(1) Through operation of the momentary action normally open switch S2, capacitors C3 and C2 are very quickly charged to the full supply extra low DC voltage present across capacitor C1 by current flow through resistor R1, diode D3 and diode D2. The charged capacitors C3 and C2 thus provide the full available extra low voltage to the gates of both FET transistors TR1 and TR2 to turn them fully on. The relay coil connected to the drain of FET TR1 is energized to close the relay contacts in series with the electrical appliance which operates. Similarly, conduction of transistor TR2 causes the voltage at point P connected to the gate of FET transistor TR3 to drop to near ground potential to result in transistor TR3 being turned off. Thus, the visual alarm V and the audible alarm A do not operate.

(2) When the switch S2 is released to open, the electrical charges stored in capacitors C2 and C3 cause TR3 and TR2 to continue to conduct so that the electrical appliance remains energized and the audible and visual alarms remain inoperative. At the same time, capacitors C2 and C3 begin to discharge through parallel resistors R2 and R3 respectively. In both cases, a point is reached during the discharge process where there is insufficient voltage across the capacitors to maintain the transistors in conduction. However, the sizing of components C2/R2 and C3/R3 is such that transistor TR2 turns off first. As TR2 turns off, the voltage at point P connected to the extra low voltage supply through R5, rises to the full available extra low supply voltage to cause FET transistor TR3 to conduct. Thus the audible alarm A and the visual alarm V operate to audibly and visually warn of an impending deenergization of the electrical appliance.

(3) Should the appliance be required to remain in operation for a longer period than that allowed by the timing circuit consisting of C3, R3 and TR3, the momentary closure of switch S2 causes both capacitors C2 and C3 to be re-charged again to the full available DC extra low voltage supply to restart both timing circuits and to simultaneously mute the audible and visual alarms. Thus the appliance remains in use for an extended period of time as required and the process may be repeated as many times if necessary.

(4) If it is not required to extend the time for which the appliance remains energized, the alarms may be muted by the momentary closure of switch 83 to selectively re-start the timing circuit consisting of C2, R2 and TR2 by charging capacitor C2 only. Thus the alarms remain muted until TR1 turns off to de-energize the relay and the electrical appliance. The alarms are re-energized after the timing circuit associated with transistor TR2 times out again if switch 81 is still closed to alert the operator so that switch S1 can be turned off. Thus, when switch S1 is turned off, the control and timing circuits are disabled and the appliance remains disconnected from mains supply.

The important safety feature of this invention is that, should an energized electrical appliance be left unattended, (a) TR2 turns off first to cause TR3 to turn on to operate the alarms, (b) then TR1 turns off to de-energize the relay and the electrical appliance, thus eliminating any possibility of an accident such as the start of a fire, (c) the alarms remain in operation to immediately warn the operator, as soon as he or she returns to the location of the appliance, that the equipment operation has been stopped. The operator then has a choice of either restarting the appliance or aborting the operation altogether by turning off switch S1.

Thus, it is realized that this invention provides means of safely operating an electrical appliance for any required period of time whilst also providing means to prevent the appliance from remaining in operation unchecked and unattended, a situation which could result in serious accidents.

The control circuit described in this embodiment may be incorporated as part of the electrical appliance, or built as a separate unit to which the appliance and the mains supply are connected. Alternatively, the control circuit may be built into a portable unit designed to plug into a power outlet from which the appliance is powered. It is also to be understood that the use and purpose of this invention is not limited to the control of electrical appliances operating from mains supply only but in effect can be used for the control of all types of appliances operating from various voltage sources, AC or DC.

What is claimed is:

1. A timing apparatus for controlling an electrical appliance comprising;

a primary timer and a primary manual resetter, where the primary timer energizes the appliance for a preset interval of time beginning either when the primary timer is energized or when the primary manual resetter is manually activated, and where the primary timer automatically de-energizes the appliance upon expiration of the predetermined interval of time;

a secondary timer and a secondary manual resetter, where the secondary timer measures a preset interval of time shorter than the interval of time of the primary timer, the preset interval of time for the secondary timer beginning when the secondary timer is energized or when the secondary timer is manually reset by manual activation of either the secondary resetter or the primary resetter, an alarm indication that indicates an alarm upon expiration of the interval of time of the secondary timer, and indicates no alarm during the interval of time of the secondary timer.

2. The apparatus of claim 1 wherein the appliance comprises a main switch that energizes the primary timer, and the secondary timer when in an on position, and de-energizes the appliance and stops the indication of the alarm from the alarm indication when in an off position.

3. The apparatus of claim 1 wherein the primary timer, primary resetter, secondary timer, the secondary resetter, and the alarm indication form part of the appliance.

4. The apparatus of claim 1 wherein the primary timer, primary resetter, secondary timer, the secondary resetter, and the alarm indication are constructed as separate unit from the appliance.

5. The apparatus of claim 1 wherein the primary timer, primary resetter, secondary timer, the secondary resetter, and the alarm indication are constructed as a plug-in module that can be connected to an electrical outlet and to which the electrical appliance can be connected by an electrical plug.

6. A method for controlling an electrical appliance comprising, energizing the appliance at the beginning of a first interval of time determined by a first timer de-energizing the appliance at the end of the first interval of time, the first interval of time begun by energizing the first timer or by manually resetting the first timer, activating an alarm indication at the end of a second interval of time during which there is no alarm indication, the second interval of time beginning when the first timer is energized or reset, or when the second time is manually reset.

7. The method of claim 4 wherein the primary timer, and the secondary timer are energized by switching an appliance on/off switch to an on position and the method further comprises deactivating the alarm indication and de-energizing the appliance by switching the appliance on/off switch to an off position.

* * * * *

UNITED STATES PATENT AND TRADEMARK OFFICE
CERTIFICATE OF CORRECTION

PATENT NO.    : 6,323,777 B1
DATED         : November 27, 2001
INVENTOR(S)   : Richard Vereker Durston and Andrew Albert Durston It is certified that error appears in the above-identified patent and that said Letters Patent is hereby corrected as shown below:

<u>Title page,</u>
Item [76], change the address for inventor Richard Vereker Durston to:
-- 47 Ambara Court, Yambina Crescent, Waramanga, ACT 2611, AU --

<u>Column 1,</u>
Line 42, change "process interrupted" to -- process may be interrupted --.
Line 43, change "As in some" to -- As some --.
Line 52, change "time times" to -- timer times --.
Line 52, change the second instance of "when" to -- and --.

<u>Column 2,</u>
Line 22, change "appliance time" to -- appliance timer --.
Line 48, change "comprises system" to -- comprises a system --.
Line 56, change "setter" to -- resetter --.

<u>Column 3,</u>
Line 6, change "silences" to -- silenced --.
Line 29, change "time" to -- timer --.
Line 42, change "Diodes" to -- diodes --.

<u>Column 4,</u>
Line 6, after "point P" add -- , --.
Line 23, change "switch 83" to -- switch S3 --.
Line 27, change "switch 81" to -- switch S1 --.

Signed and Sealed this

Twenty-fifth Day of June, 2002

*Attest:*

JAMES E. ROGAN
*Director of the United States Patent and Trademark Office*

*Attesting Officer*